United States Patent
Demmers

[19]

[11] Patent Number: 5,922,208
[45] Date of Patent: Jul. 13, 1999

[54] FILTER DEVICE

[75] Inventor: Petrus Adrianus Cornelis Maria Demmers, Nieuw Vossemeer, Netherlands

[73] Assignee: Defil N.V. Holland Intertrust (Antilles) N.V., Netherlands

[21] Appl. No.: 08/973,527

[22] PCT Filed: Jun. 10, 1996

[86] PCT No.: PCT/NL96/00231

§ 371 Date: Mar. 10, 1998

§ 102(e) Date: Mar. 10, 1998

[87] PCT Pub. No.: WO96/41670

PCT Pub. Date: Dec. 27, 1996

[30] Foreign Application Priority Data

Jun. 8, 1995 [NL] Netherlands ............................ 1000530

[51] Int. Cl.⁶ ................................................. B01D 29/62
[52] U.S. Cl. ......................... 210/741; 210/791; 210/106; 210/112; 210/407; 210/418
[58] Field of Search ..................... 210/741, 791, 210/106, 409, 446, 236, 357, 418, 419, 432, 744, 112, 407

[56] References Cited

U.S. PATENT DOCUMENTS

| | | | |
|---|---|---|---|
| 1,384,305 | 7/1921 | Crotto | 15/104.05 |
| 4,043,918 | 8/1977 | Orona | 210/356 |
| 4,267,002 | 5/1981 | Sloan et al. | 264/DIG. 75 |
| 5,141,650 | 8/1992 | Cavo et al. | 210/741 |
| 5,328,617 | 7/1994 | De Haan et al. | 210/791 |
| 5,362,403 | 11/1994 | Dosoudil | 210/791 |
| 5,547,624 | 8/1996 | Shah | 264/103 |

FOREIGN PATENT DOCUMENTS

| | | |
|---|---|---|
| 2 242 153 | 3/1975 | France . |
| 7111921 | 3/1972 | Netherlands . |
| 7314302 | 4/1974 | Netherlands . |

OTHER PUBLICATIONS

International Search Report.

Primary Examiner—Jay H. Woo
Assistant Examiner—Frank M. Lawrence
Attorney, Agent, or Firm—Evenson, McKeown, Edwards & Lenahan P.L.L.C.

[57] ABSTRACT

A method for filtering out of a liquid at least one solid substance includes supplying the liquid containing the substance via axial supply to a filter; filtering the liquid wherein the substance remains in the filter as residue; draining away the liquid; compressing a predetermined amount of residue to the shape of a solid bar under the pressure of the liquid during filtering; opening closeable discharge axially opposite the supply end during filtering; and removing the bar out of the filter under the pressure exerted by the liquid on the bar.

11 Claims, 4 Drawing Sheets

FILTER DEVICE

This application is a 371 of PCT application No. NL96/00231 filed Jun. 10, 1996.

The present invention relates to a method for filtering out of a liquid at least one solid substance comprised therein with essentially tube-shaped filter means, said method comprising consecutively:

supplying said liquid containing said substance via axial supply means to said filter means;

filtering said liquid containing said substance where said substance remains in said filter means as residue; draining away said liquid via drain means; and removing said residue out of said filter via discharge means closed during filtering and axially opposite said supply means.

Such a method is known from the Dutch patent application 71.11921, where a filter device is described, to which discharge means is connected having a diameter corresponding to that of said filter means.

After opening of said closeable discharge means said filter means is rinsed, which is known as the so-called "blow-down"-process. This process is performed with fluid to be filtered, where as a result efficiency and performance of such a method remain low.

Another disadvantage of said. known method is, that it is inevitably required to interrupt said known filter method in order to rinse said filter.

The invention has for its object to obviate the above stated drawbacks and provides for this purpose a method, which is distinguished by: compressing a predetermined amount of residue to the shape of mainly a solid bar under the influence of pressure in said supplied liquid, when filtering;

opening said closable discharge means at a predetermined moment; and removing said bar under influence of pressure on said bar exerted by said liquid.

By performing a method according to the present invention a compact accumulation of residue formed during a filtering process under pressure from the supplied flow of liquid is ejected in its entirety by opening the closeable second discharge means, whereafter the filtering process can be immediately resumed. To this end it is not required to interrupt the flow of fluid to be filtered or the filtering process itself.

In a first preferred embodiment of a method according to the present invention such a method is distinguished by measurement of said pressure exerted by said fluid on said bar while filtering, in order to open said discharge means when a predetermined value of said pressure is attained.

As a result with a method according to this embodiment a minimum amount of fluid to be filtered is lost when removing said residue.

In a second preferred embodiment of a method according to the present invention such a method is distinguished by performing a pound or shake process on said filter means, if said pressure in said filter means is inadequate or if a time span between opening of said discharge means and the moment in time, where said bar starts to move, exceeds a predetermined value.

As a result such a method according to this second embodiment is extremely reliable in that the bar of residue formed in said filter means is with certainty removed before said discharge means is brought into a closed state thereof. The bar of residue is with certainty removed before said closing of said discharge means and damaged to said discharge is avoided.

In a third preferred embodiment of a method according to the present invention such a method is distinguished by setting a length of said bar of residue to be formed in said filter means by covering passages for said fluid in said filter means along at least a part of the length of said filter means.

As a result factors contributing to friction between said bar and said filter means can be taken into account by setting the length of the bar to be formed. Such factors may comprise temperature, roughness of the inner surface of said filter means, roughness of the outer surface of the bar to be formed, etc.

It is noted here, that the invention also relates to a device for performing a method according to the present invention, and particularly the second and third preferred embodiments thereof described above.

The invention will be elucidated further with reference to the figure description hereinbelow of a number of embodiments of the invention. In the drawing.

In the figures the same components are referred to with the same reference numeral.

Figure 1:
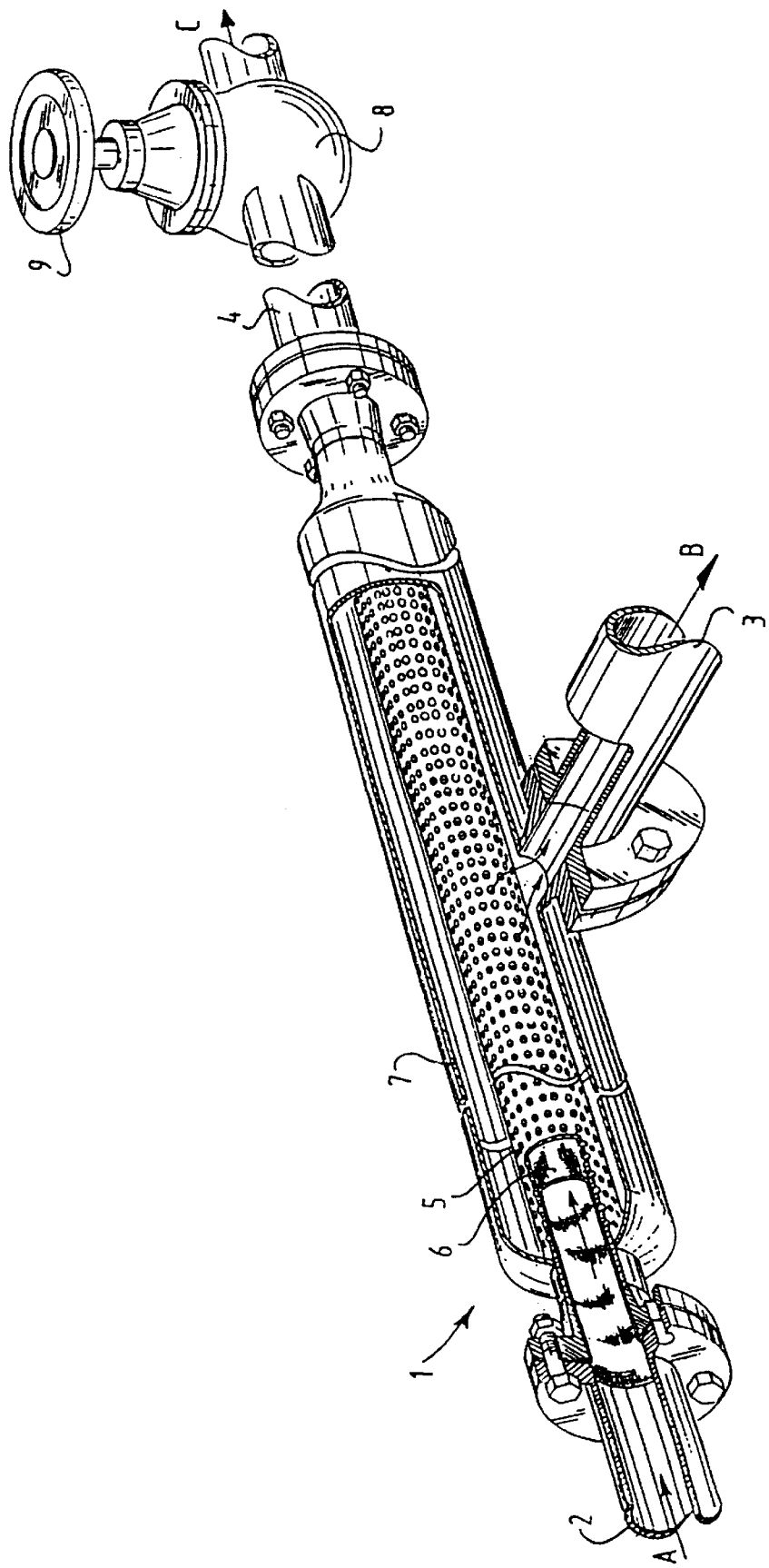
FIG. 1 shows a partially cut away perspective view of a first embodiment of a filter device according to the present invention.

The embodiment of the invention shown in FIG. 1 comprises: filter means as tube-shaped filter 1; supply means designed as supply tube 2; drain means designed as drain tube 3; and closeable second discharge means designed as closeable discharge tube 4, which is provided with a closing mechanism designed as ball closure 8 which can be operated with control means designed as a tap 9.

The filter 1 comprises a filter tube 5 with two open ends, wherein the one open supply end hereof is connected in leakproof manner to supply tube 2 and the other open discharge end hereof is connected in leakproof manner to closeable discharge tube 4. The filter tube 5 is provided with a large plurality of holes arranged in radial direction and is covered on the inside thereof with a filter material 6.

During the filtering process the liquid for filtering flows under pressure in the direction of arrow A into the supply end of the filter tube 5, wherein the ball closure 8 is in the closed situation. The pressure under which the liquid for filtering is sent into filter tube 5 is generated for instance by a pump connected to supply tube 2. The liquid then flows through the filter material 6 and through the holes arranged in filter tube 5, wherein components present in the liquid for filtering remain behind as residue in filter tube 5.

Use can be made as filter material 6 of a wide variety of materials known in the art, such as paper, plastic, woven materials etc. The choice of a material is herein determined by the size of the individual component particles present in the liquid for filtering.

The liquid flowing through filter material 6 and through the holes in filter tube 5 is collected in housing means designed as a tube 7 which encloses filter tube 5 and which is connected in leakproof manner to drain tube 3, through which the filtered liquid is drained in the direction of arrow B.

After a time a quantity of residue is present in filter tube 5 such that this becomes blocked and no longer functions.

The pressure herein rises at the supply end of filter tube 5. This pressure increase can be detected using a pressure gauge connectable to supply tube 2.

Under the influence of the pressure exerted from the supply end of filter tube 5 the residue is compressed into a compact bar. Tap 9 is then operated in order to place ball closure 8 in the opened state thereof. Under the influence of the same pressure the bar of residue is then ejected through the other open discharge end of filter tube 5 and through the closeable discharge tube 4 in the direction of arrow C. Opening of the ball closure 8 can take place in response to a pressure threshold value being exceeded at the supply end of filter tube 5 or after determining that liquid is no longer being transported through drain tube 3.

After the whole length of the bar of residue has passed through the ball closure 8, tap 9 is again operated in order to place the ball closure 8 in the closed situation thereof. In preference the ball closure 8 is placed in the closed situation immediately after the rear part of the bar of residue in the direction of movement thereof has moved past the ball closure 8.

Figure 2:
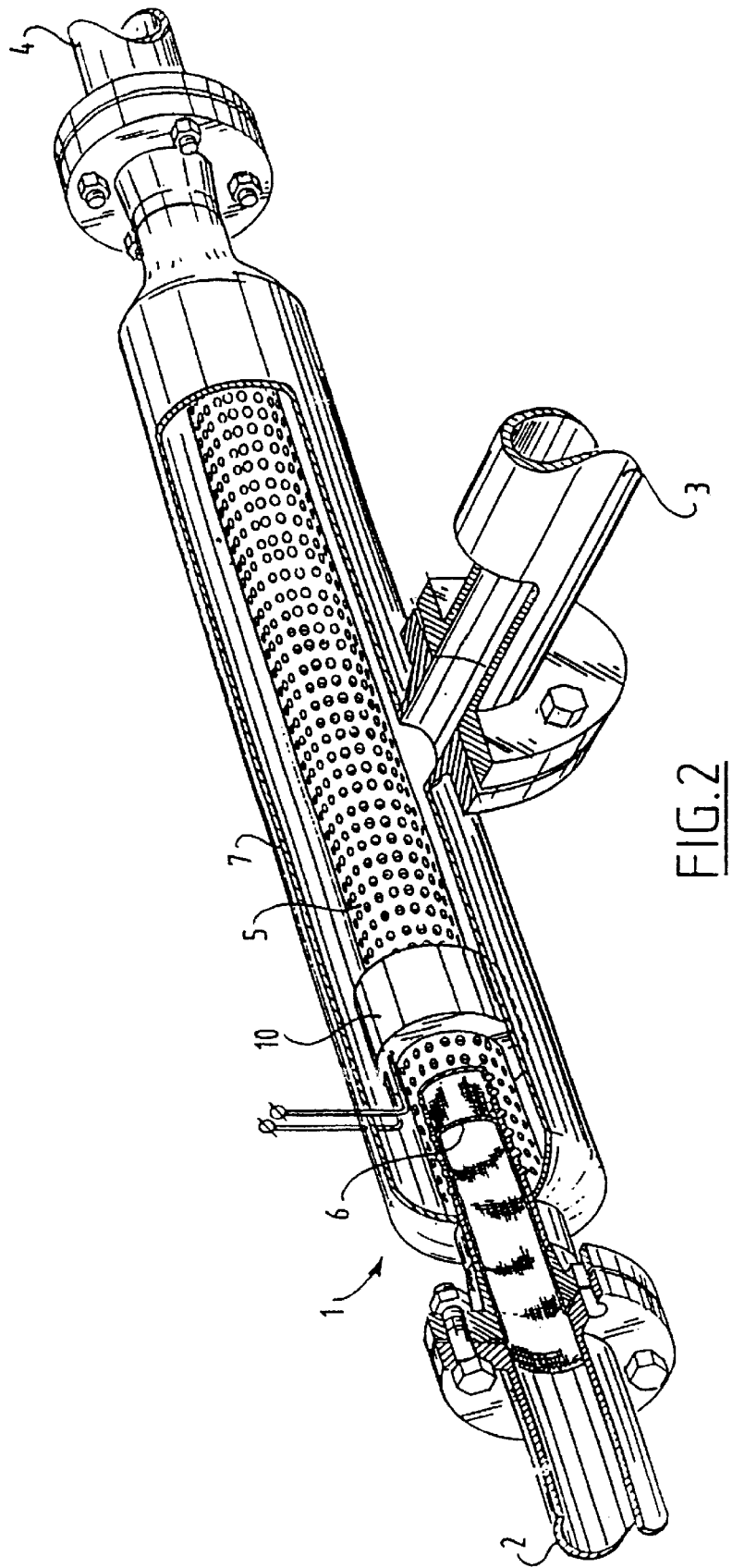
FIG. 2 is a partially cut away perspective view of a second embodiment of a filter device according to the present invention.

The embodiment of the invention shown in FIG. 2 contains an electric vibration mechanism 10 which can be connected through the enclosing tube 7 to a control circuit, wherein such a control circuit serves to set the vibrating mechanism into operation at a desired time. This vibrating mechanism is of particular importance when the bar of residue formed during the filtering process has a high frictional resistance relative to the filter material 6 such that the bar of residue remains jammed in filter tube 5 despite the pressure exerted. This phenomenon can be observed because the pressure at the supply end of filter tube 5 does not decrease or continues to increase after the closing mechanism connected to the discharge end of filter tube 5 has been placed in the opened situation thereof. The vibrating mechanism 10 can be set into operation immediately after each opening of the closing mechanism, or only when the bar of residue is observed to remain jammed in filter tube 5.

In another embodiment (not shown), use can be made of a striking mechanism instead of the vibrating mechanism shown in this figure, or of another apparatus functioning in similar manner. It is also possible for example for such a vibrating or striking mechanism to be arranged round the enclosing tube 7.

Figure 3:
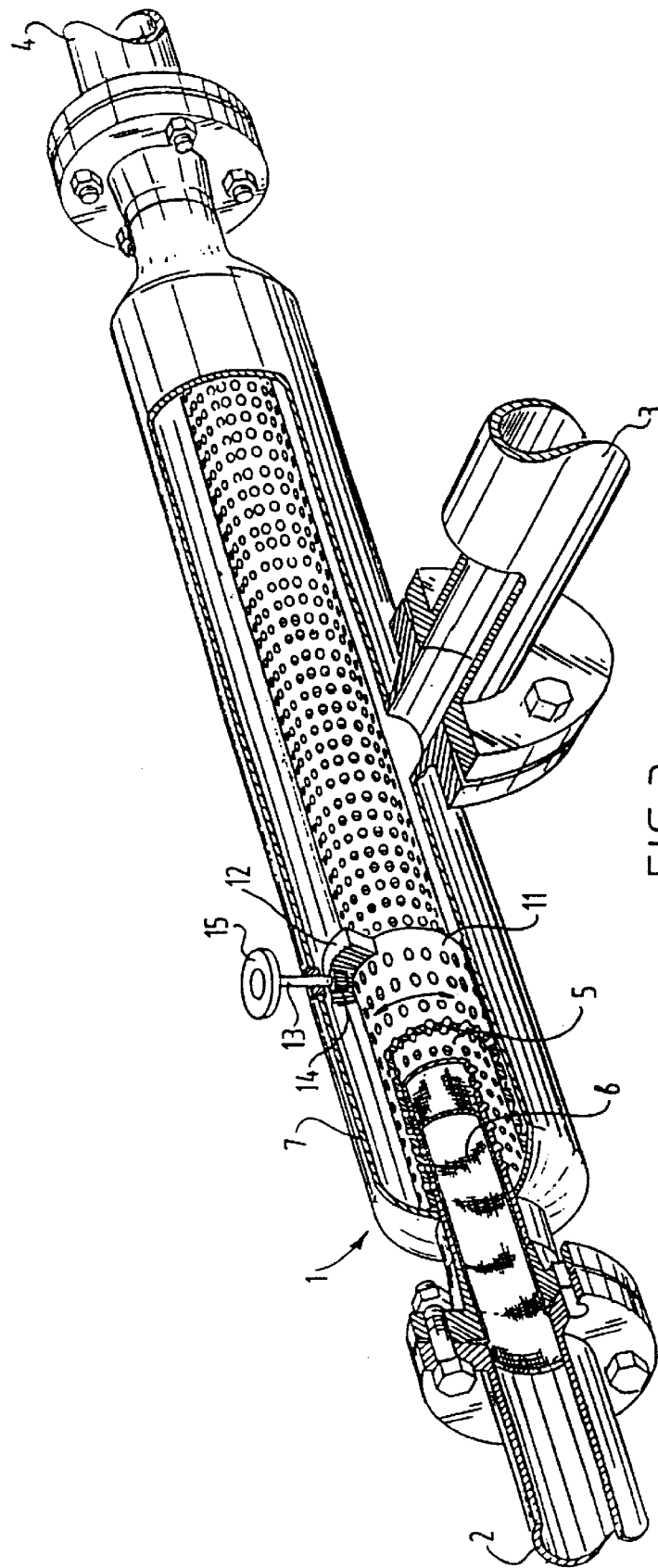
FIG. 3 is a partially cut away perspective view of a third embodiment of a filter device according to the present invention.

In FIG. 3 the filter 1 contains regulating means designed as a sleeve 11, which sleeve 31 connects close-fittingly onto filter tube 5 and is rotatable there-around. The sleeve 11 is provided with holes, the placing of which in sleeve 11 corresponds with the hole pattern in filter tube 5. Rotating of the sleeve 11 is effected using a gear rack 12 fixed to sleeve 11 and a toothed wheel 14 co-acting therewith, wherein toothed wheel 14 is rotatable from outside the filter 1 using wheel 15 and shaft 13. By rotating the sleeve 11 a number of the filter openings in filter tube 5 can be closed in adjustable manner. The entire length of filter tube 5 is hereby effectively utilized in a position of the sleeve 11 wherein the holes in filter tube 5 and in sleeve 11 correspond, and only the portion of the length of filter tube 5 not covered by sleeve 11 is effectively utilized in a position of the sleeve 11 wherein the sleeve 11 covers the holes in filter tube 5.

Figure 4:
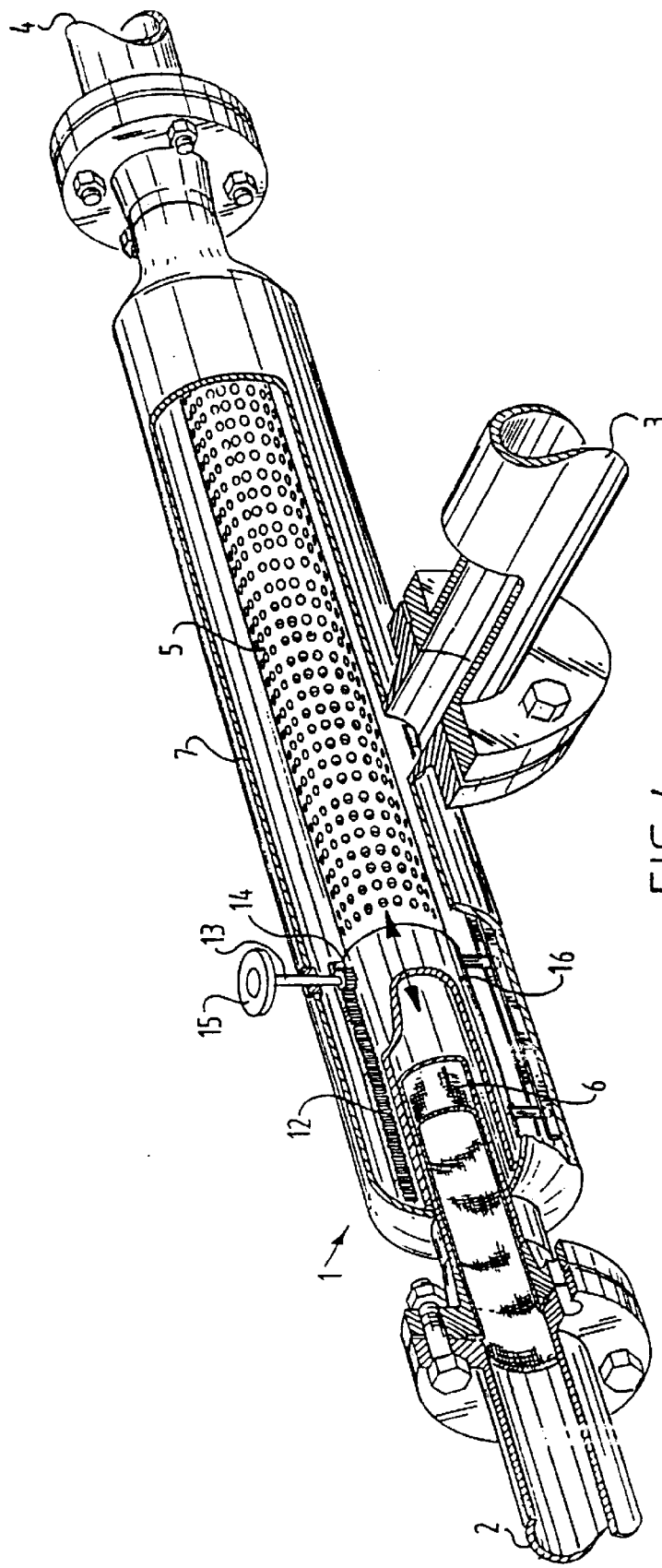
FIG. 4 shows a partially cut away perspective view of a fourth embodiment of a filter device according to the present invention.

In FIG. 4 the filter 1 contains regulating means designed as a sleeve 16, which sleeve L6 connects close fittingly onto filter tube 5 and is displaceable in axial direction thereof. In this way the sleeve 16 forms another embodiment of a covering member. Displacement of sleeve 16 is effected using a gear rack 12 fixed to sleeve 16 and a toothed wheel 14 co-acting therewith, wherein toothed wheel 14 is rotatable from outside the filter 1 using wheel 15 and shaft 13. By displacing the sleeve 16 a number of holes in filter tube 5 can be closed, so that the number of active holes in filter tube 5 is varied. The filter tube 5 contains a portion without holes, wherein the length of this part corresponds with the length of sleeve 16. Only after axial displacement of sleeve 16 from the extreme position thereof shown in this figure will the sleeve 16 cover a number of holes in filter tube 5, whereby the length of the bar of residue for forming during the filtering process can be controlled. The range within which sleeve 16 is displaceable along filter tube 5, and therefore the length range of the bar of residue for forming, depends on the ratio of the length of filter tube 5 and the length of sleeve 16.

Controlling of the length of the bar of residue formed during the filtering. process is of particular importance when the filter device according to the present invention is used successively to filter liquids containing different types of components. After opening of the closing mechanism a bar of residue formed during the filtering process will be ejected at a pressure which is substantially dependent on the mutual frictional resistance between the formed bar of residue and the inside of filter material 6, wherein the frictional resistance depends inter alia on the substances of which the residue consists. By correctly positioning sleeve 16 and therefore correctly controlling the length of the bar of residue to be formed, this frictional resistance is held such that after opening of the closing mechanism the bar of residue for forming will be ejected with certainty from the filter tube 5 at a lower pressure than the maximum which can for instance be generated by a pump at the supply end of filter tube 5.

A filter device according to the present invention is preferably provided with determining means connected to the control means of the closing mechanism. These determining means serve to determine the period of time for which the closing mechanism is situated in an opened state and, after this period of time has elapsed, to set the control means into operation in order to return the closing mechanism to the closed state thereof. It is herein desirable that the closing mechanism once again returns to the closed position immediately after the full length of the formed bar of residue has passed through, so that no or at least very little of the liquid for filtering follows the bar of residue into the closeable discharge tube 4 before the closing mechanism returns to the closed state thereof. This period of time depends on a large number of conditions, such as: the delay which occurs before the formed bar of residue starts to move after the closing mechanism has been opened; the frictional resistance between the formed bar of residue and the filter material; the pressure at which the formed bar of residue actually starts to move, etc. The determining means can therefore be designed as a computer which computes the period of time on the basis of known data for the filtering process and/or on the basis of measurement data collected during operation of the device, for example by sensors, such as the above mentioned pressure gauge at the supply end of the filter tube. When these sensors are for instance detection sensors which detect the presence of the bar of residue at a position in the filter tube directly close to the closing mechanism, the signal generated thereby can serve as control signal for the control means.

A closing mechanism in a filter device according to the present invention is preferably arranged as close as possible to the discharge end of the filter so that no or at least very little liquid for filtering in front of the formed bar of residue is ejected via the closeable second discharge means after opening of the closing mechanism.

I claim:

1. A method for filtering out of a liquid at least one solid substance, said method comprising consecutively:

supplying said liquid containing said substance via axial supply means to tube-shaped filter means;

filtering said liquid containing said substance wherein said substance remains in said filter means as residue;

draining away said liquid;

compressing a predetermined amount of residue to the shape of a solid bar under the pressure of said liquid during filtering;

opening closeable discharge means axially opposite said supply means during said filtering; and removing said bar out of said filter means under the pressure exerted by said liquid on said bar.

2. A method according to claim 1, further comprising measuring said pressure exerted by said liquid on said bar during filtering, and opening said discharge means when a predetermined value of said pressure is attained.

3. A method according to claim 1, further comprising closing said discharge means after said bar has passed by said discharge means.

4. A method according to claim 3, further comprising:

observing said bar passing by said discharge means; and closing said discharge means in response to said observing.

5. A method according to claim 3, further comprising closing said discharge means after a predetermined period of time required for removing said bar.

6. A method according to claim 5, further comprising observing when said bar starts to move for closing said discharge means after said predetermined period of time.

7. A method according claim 1, further comprising pounding or shaking said filter means, if said pressure in said filter means is inadequate or if a time span between opening of said discharge means and the moment in time, when said bar starts to move, exceeds a predetermined value.

8. A method according to claim 1, further comprising setting a length of said bar to be formed in said filter means by covering passages for said fluid in said filter means along at least a part of the length of said filter means.

9. A device for carrying out a method according to claim 7, said device comprising:

mainly tube-shaped filter means with housing means for collecting said filtered liquid;

supply means connected to a first axial end of said filter means for supplying said liquid containing said substance;

drain means connected to said housing means for collecting said filtered liquid; and closeable discharge means connected to a second axial end of said filter means opposite to said supply means for removing residue filtered from said fluid containing said substance, wherein said filter means comprises a pound or shake mechanism for release of a bar of residue in an opened state of said closeable discharge means, said bar having been formed in said filter means while filtering.

10. A device for carrying out the method according to claim 8, said device comprising:

mainly tube-shaped filter means with housing means for collecting said filtered fluid;

supply means connected to a first axial end of said filter means for supplying said fluid containing said substance;

drain means connected to said housing means for collecting said filtered fluid; and closeable discharge means connected to a second axial end of said filter means for removing filtered and compressed residue in the shape of a bar from said filter means; and wherein said filter means comprises covering means in close contact with said filter means and movable in the axial direction of said filter means.

11. A device for carrying out the method of claim 3, said device comprising:

mainly tube-shaped filter means with a housing for guiding said filtered fluid;

supply means connected to a first axial end of said filter means for supplying said fluid containing said sasubstance;

drain means connected to said housing means for collecting said filtered fluid;

closeable discharge means connected to a second axial end of said filter means for removing filtered and compressed residue in the shape of a bar from said filter means; and control means for controlling opening and closing of said discharge means, wherein said control means comprises calculating means for determining at least one of the period of time for opening said discharge means, and the moment in time for closing said discharge means.

* * * * *